United States Patent
Miao et al.

(10) Patent No.: US 10,012,127 B2
(45) Date of Patent: Jul. 3, 2018

(54) METHODS OF USING GAS SENSORS

(71) Applicant: GM GLOBAL TECHNOLOGY OPERATIONS LLC, Detroit, MI (US)

(72) Inventors: Yong Miao, Ann Arbor, MI (US); Christopher L. Whitt, Howell, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 55 days.

(21) Appl. No.: 15/228,499

(22) Filed: Aug. 4, 2016

(65) Prior Publication Data

US 2018/0038260 A1 Feb. 8, 2018

(51) Int. Cl.
- *F01N 3/00* (2006.01)
- *F01N 11/00* (2006.01)
- *F01N 3/20* (2006.01)

(52) U.S. Cl.
CPC .......... *F01N 11/007* (2013.01); *F01N 3/2006* (2013.01); *F01N 3/2066* (2013.01); *F01N 2570/14* (2013.01); *F01N 2900/1621* (2013.01)

(58) Field of Classification Search
USPC ................ 60/274, 276, 277, 286, 297, 301; 204/406, 410, 421, 424, 425; 205/781, 205/784, 786.5, 788
See application file for complete search history.

(56) References Cited

U.S. PATENT DOCUMENTS

| | | | | |
|---|---|---|---|---|
| 6,295,862 B1* | 10/2001 | Kurokawa | ........... | G01N 27/417 204/410 |
| 7,073,320 B2* | 7/2006 | Moritsugu | ......... | G01N 27/4175 123/688 |
| 8,394,248 B2* | 3/2013 | Kobayashi | ......... | G01N 27/4074 204/424 |
| 8,418,493 B2* | 4/2013 | Chang | .................... | F04B 9/042 417/273 |
| 9,528,424 B2* | 12/2016 | Aoki | ..................... | F01N 3/2066 |
| 9,670,817 B2* | 6/2017 | Yoo | ......................... | F01N 3/208 |

* cited by examiner

*Primary Examiner* — Binh Q Tran

(57) ABSTRACT

Methods for monitoring the performance of an oxidizing catalyst device are provided. Methods can include treating an exhaust gas stream with the oxidizing catalyst device, determining a reference liberated oxygen (LO) species measurement of the exhaust gas stream, measuring a downstream LO species measurement of the exhaust gas stream using a $NO_x$ sensor in a catalyst inactive mode, and determining a LO species differential. The downstream $NO_x$ sensor can comprise an amperometric sensor and include a $NO_2$ selective reduction catalyst. Methods for using an amperometric $NO_x$ sensor utilizing an $NO_2$ selective reduction catalyst are also provided, and include operating the NOx sensor in a catalyst active mode to generate a first LO species measurement, operating the $NO_x$ sensor in a catalyst inactive mode to generate a second LO species measurement, and comparing the first LO species measurement to the second LO species measurement to determine a LO species differential.

20 Claims, 2 Drawing Sheets

METHODS OF USING GAS SENSORS

INTRODUCTION

During a combustion cycle of an internal combustion engine (ICE), air/fuel mixtures are provided to cylinders of the ICE. The air/fuel mixtures are compressed and/or ignited and combusted to provide output torque. After combustion, pistons of the ICE force exhaust gases in the cylinders out through exhaust valve openings and into an exhaust system. The exhaust gas emitted from an ICE, particularly a diesel engine, is a heterogeneous mixture that contains gaseous emissions such as carbon monoxide (CO), unburned hydrocarbons and oxides of nitrogen ($NO_x$), and oxides of sulfur ($SO_x$), as well as condensed phase materials (liquids and solids) that constitute particulate matter. For example, $NO_2$ typically comprises 20% of total $NO_x$ in diesel exhaust. Exhaust gas treatment systems are often employed to reduce $NO_x$ emissions from exhaust gas streams.

Exhaust gas treatment systems may employ catalysts in one or more components configured for accomplishing an after-treatment process such as reducing $NO_x$ to produce more tolerable exhaust constituents of nitrogen ($N_2$) and water ($H_2O$). One type of exhaust treatment technology for reducing $NO_x$ emissions is a selective catalytic reduction (SCR) device, which generally includes a substrate or support with a catalyst compound disposed thereon. Regarding the reduction of $NO_2$ and NO, there are generally three reduction reactions which occur within the SCR as shown in Equations (1)-(3).

$$NO + NH_3 \rightarrow N_2 + H_2O \quad (1)$$

$$NO + NO_2 + NH_3 \rightarrow N_2 + H_2O \quad (2)$$

$$NO_2 + NH_3 \rightarrow N_2 + H_2O \quad (3)$$

Equation (2), which more preferentially occurs near 1:1 $NO_2$:NO ratios, exhibits the fastest $NO_x$ reduction rate. Accordingly, oxidation catalyst (OC) devices can be utilized upstream from SCR devices to preferentially increase $NO_2$:NO concentration ratios in exhaust gas streams to approximately 1:1 ratios.

Sensors are used to monitor total $NO_x$ concentrations in gas streams, for example downstream of an OC device, but accurately monitoring $NO_2$ concentrations remains a challenge. Amperometric sensors, for example, determine total $NO_x$ concentration by reducing $NO_x$ species within a sample and measuring the liberated oxygen species.

SUMMARY

According to an aspect of an exemplary embodiment, a method for monitoring the performance of an oxidizing catalyst device is provided. The method can include treating an exhaust gas stream with the oxidizing catalyst device, determining a reference liberated oxygen species measurement of the exhaust gas stream, measuring a downstream liberated oxygen species measurement of the exhaust gas stream using a downstream $NO_x$ sensor in a catalyst inactive mode, and comparing the reference liberated oxygen species measurement to the downstream $NO_x$ liberated oxygen species measurement to determine a liberated oxygen species differential. The downstream $NO_x$ sensor can comprise a $NO_2$ selective reduction catalyst. The downstream $NO_x$ sensor can comprise an amperometric $NO_x$ sensor.

According to an aspect of an exemplary embodiment, a method for using an amperometric $NO_x$ sensor utilizing an $NO_2$ selective reduction catalyst is provided. The method can include operating the amperometric $NO_x$ sensor in a catalyst active mode to generate a first liberated oxygen species measurement, operating the amperometric $NO_x$ sensor in a catalyst inactive mode to generate a second liberated oxygen species measurement, and comparing the first liberated oxygen species measurement to the second liberated oxygen species measurement to determine a liberated oxygen species differential.

Although many of the embodiments herein are describe in relation to amperometric $NO_x$ sensors utilizing $NO_2$ selective reduction catalysts, the embodiments herein are generally suitable for all gaseous sensors utilizing selective oxidation/reduction catalysts.

Other objects, advantages and novel features of the exemplary embodiments will become more apparent from the following detailed description of exemplary embodiments and the accompanying drawings.

DETAILED DESCRIPTION

Figure 1:
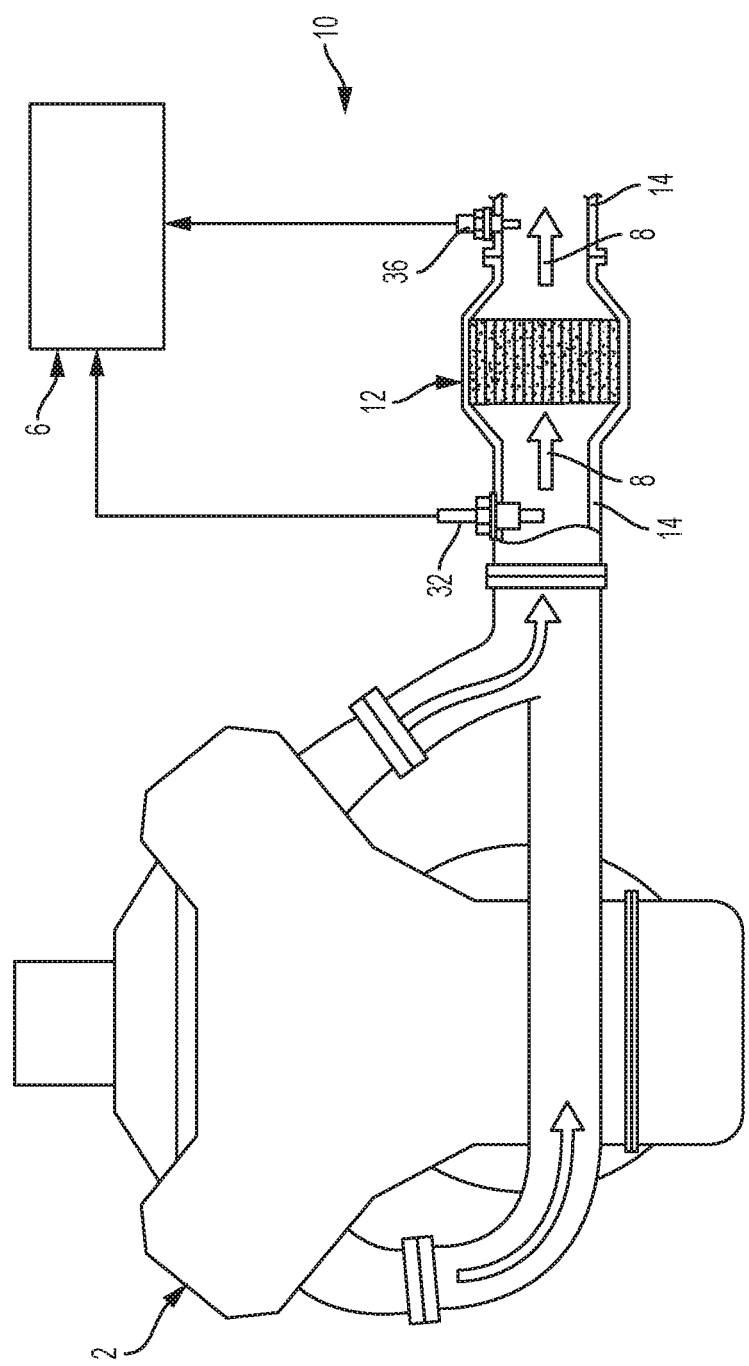
FIG. 1 illustrates an exhaust gas treatment system, according to one or more embodiments.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Generally, this disclosure pertains to gas sensors and methods of determining the concentration of oxides of nitrogen ($NO_x$) in a gaseous sample. In particular, this disclosure pertains to $NO_x$ sensors used to determine NO and $NO_2$, concentrations in exhaust gas streams. Exhaust gas streams are generated, in some embodiments, by internal combustion engines (ICE) which can, for example, power a vehicle. As used herein, "$NO_x$" refers to one or more nitrogen oxides. $NO_x$ species can include $N_yO_x$ species, wherein y>0 and x>0. Non-limiting examples of nitrogen oxides can include NO, $NO_2$, $N_2O$, $N_2O_2$, $N_2O_3$, $N_2O_4$, and $N_2O_5$.

Many of the $NO_x$ sensors rely on the potentiometric (i.e., mixed potential) or amperometric measurement of oxygen partial pressure resulting from the decomposition of NO' molecules to NO, and NO to $N_2$ and $O_2$ in order to determine NO$_x$ concentration. Amperometric NO$_x$ sensors determine total NO$_x$ concentration by reducing NO$_x$ species within a sample and measuring the liberated oxygen species. Because NO$_2$ and NO will liberate different quantities of oxygen, this method of operation imposes an inherent cross-sensitivity to NO$_x$ species (e.g., NO$_2$ and NO). Accordingly, gaseous samples of equivalent total NO$_x$ concentrations can produce varying total NO$_x$ concentration response signals depending on the respective partial pressures of NO$_2$ and NO. Such response variations are typically obviated with an initial decomposition of NO$_2$ to NO prior to the final NO$_x$ (i.e., NO) reduction and oxygen species measurement. While accurate measurement of total NO$_x$ concentration can thereafter be achieved, the sensor is deprived of NO$_x$ species cross-sensitivity.

NO$_x$ sensors, such as an amperometric NO$_x$ sensor, generally comprise two stages: a first background oxygen purge stage, and a second NO$_x$ species measuring stage. Background oxygen is purged in the first stage so that it does not interfere with accurate measurement of NO$_x$ species in the second stage. A gas sample containing NO$_x$ species is introduced to the first stage, and oxygen species are pumped out via one or more methods. The first stage can include a NO$_2$ selective reduction catalyst for reducing NO$_2$ species to NO. Complete reduction of all NO$_2$ to NO is preferred in the first stage in order to prevent NO$_2$ dissociated oxygen species from being double counted in the second stage. Purged background oxygen species in this first stage can accordingly include oxygen species germane to the gas sample, and oxygen species generated during the selective reduction of NO$_2$ species. Background oxygen species can be purged, for example, using electrochemical pumps. Electrochemical pumps apply a bias (e.g., −200 mV to −400 mV) which reduces diatomic oxygen to O$^=$ and pumps the ions from the stage. Pumping current can be proportional to the amount of oxygen present in the stage.

The NO$_2$ selective reduction catalyst can comprise any suitable catalyst which reduces NO$_2$ to NO. For example, the selective reduction NO$_x$ catalyst can operate to selectively reduce NO$_2$ to NO. Selectivity can include complete selectivity or partial selectivity. In some embodiments, the NO$_2$ selective reduction catalyst is one which will not reduce NO (i.e., complete selectivity). In some embodiments, suitable materials for NO$_2$ selective reduction catalysts can include rhodium or platinum, for example. In some embodiments, the catalyst can include one or more platinum group metal catalysts. Suitable platinum group metals include Pt, Pd, Rh, Ru, Os or Tr, or combinations thereof, including alloys thereof. In some embodiments, the selective reduction NO$_x$ catalyst can operate to selectively reduce NO$_2$ to NO only under certain operating conditions, such as defined by temperature. Additionally or alternatively, the selective reduction NO$_x$ catalyst can operate to not reduce NO under certain operating conditions, such as defined by temperature. An operating temperature can be greater than about 650° C., greater than about 700° C., greater than about 750° C., greater than about 800° C., greater than about 850° C., or greater than about 900° C., for example. A temperature condition can be determined by a NO$_2$:NO equilibrium. Oxides of nitrogen concentrations in a gas are generally governed by the equilibrium shown in Equation 4 below.

$$NO + \tfrac{1}{2}O_2 \leftrightarrows NO_2 \qquad (4)$$

In this relationship, the total system NO$_x$ concentration can be simplified as substantially the sum of NO and NO$_2$, in which the concentration of NO varies inversely with temperature. For example, at 100° C. the NO$_2$:NO ratio can approach a maximum limit (i.e., 100% NO$_2$), whereas at about 300 to 400° C. the NO$_2$:NO ratio can be approximately 1, and at about 700° C. or above the NO$_2$:NO ratio can be 1:20 or less. Accordingly, a catalytically active operating temperature for a NO$_2$ selective reduction catalyst can be greater than about 650° C., greater than about 700° C., greater than about 750° C., greater than about 800° C., greater than about 850° C., or greater than about 900° C., for example. In some embodiments, a NO$_2$ selective reduction catalyst comprises a heating element, which increases the temperature of a gas sample such that the NO$_2$:NO ratio is decreased. The heating element can be in the form of a heating electrode formed about the stage or the entire NO$_x$ sensor, for example.

A suitable NO$_2$ selective reduction catalyst will have structural stability over the range of operating temperatures. In some embodiments, a suitable catalyst will have structural stability over a range of temperatures including the operating temperatures, and temperatures below the operating temperatures. The temperatures below the operating temperatures can be those at which a desired NO$_2$:NO ratio can be achieved, such as a high NO$_2$:NO ratio.

In the second stage of the NO$_x$ sensor, NO$_x$ species (i.e., NO) are catalytically decomposed to N$_2$ and O$_2$. The second stage generally detects the partial pressure of oxygen whose volume is increased as a function of the amount of the NO$_x$ catalytically reduced. Catalytic decomposition can be effected utilizing a reduction catalyst comprising rhodium or platinum, for example. In some embodiments, the catalyst can include one or more platinum group metal catalysts. Suitable platinum group metals include Pt, Pd, Rh, Ru, Os or Ir, or combinations thereof, including alloys thereof. The reduction catalyst can include a catalytic electrode. The dissociated oxygen is then pumped from the stage and measured. Dissociated oxygen can be measured volumetrically, as a change in voltage within an oxygen concentration cell, or based upon the pumping current, for example.

NO$_x$ sensors are commonly utilized in exhaust gas treatment systems. FIG. 1 illustrates an exhaust gas treatment system 10 for treating and/or monitoring the exhaust gas 8 constituents of an ICE 2. The exhaust gas treatment system 10 described herein can be implemented in various ICE systems that can include, but are not limited to, diesel engine systems, gasoline direct injection systems, and homogeneous charge compression ignition engine systems. The ICEs will be described herein for use in generating torque for vehicles, yet other non-vehicular applications are within the scope of this disclosure. Therefore when reference is made to a vehicle, such disclosure should be interpreted as applicable to any application of an ICE. Moreover, ICE 2 can generally represent any device capable of generating an exhaust gas 8 comprising NO$_x$ species, and the disclosure herein should accordingly be interpreted as applicable to all such devices. It should be further understood that the embodiments disclosed herein may be applicable to treatment of effluent streams not comprising NO$_x$ species, and, in such instances, ICE 2 can also generally represent any device capable of generating an effluent stream comprising not comprising NO$_x$ species. For Example, ICE 2 can include a plurality of reciprocating pistons (not shown) attached to a crankshaft (not shown), which may be operably attached to a driveline, such as a vehicle driveline (not shown), to deliver tractive torque to the driveline. For example, ICE 2 can be any engine configuration or application, including various vehicular applications (e.g., automotive, marine and the like), as well as various non-vehicular applications (e.g., pumps, generators and the like).

The exhaust gas treatment system 10 generally includes one or more exhaust gas conduits 14, and one or more exhaust treatment devices, such as oxidation catalyst (OC) device 12 in fluid communication with ICE 2. The exhaust gas conduit 14, which can comprise several segments, transports exhaust gas 8 from the ICE 2 to the various exhaust treatment devices of the exhaust gas treatment system 10. In some exemplary embodiments, exhaust gas 8 can comprise $NO_x$ species.

The exhaust gas treatment system 10 further generally includes downstream $NO_x$ sensor 36 and optionally upstream $NO_x$ sensor 32. As used herein, a component being located upstream relative to a downstream component generally means that it is relatively closer to the ICE 2, or that exhaust gas 8 arrives at the upstream component prior to the downstream component. Downstream $NO_x$ sensor 36 and optional upstream $NO_x$ sensor 32 can be operatively connected to electronic engine control module (ECM) 6 that may be configured to accomplish control within exhaust gas 8 in accordance with control methods and strategies described herein. As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality. The exhaust gas treatment system 10 can optionally further include one or more additional exhaust treatment devices (not shown), including a particulate filter device, a selective catalytic reduction (SCR) device, and a selective catalytic reduction filter (SCRF) device. For example, in some embodiments, the OC device 12, such as a diesel oxidation catalyst (DOC) device, can be positioned upstream of an SCR device or SCRF device to convert NO into $NO_2$ for preferential treatment in the SCR device or SCRF device.

Generally, the OC device 12 is a flow-through device utilized to oxidize $NO_x$ species. Accordingly, during proper operation of the OC device 12, exhaust gas 8 upstream of the OC device will have a lower $NO_2$:NO ratio than exhaust gas 8 downstream of the OC device 12. In some embodiments, the exhaust gas 8 downstream of the OC device 12 will have a $NO_2$:Total $NO_x$ ratio of at least 3:10, at least 2:5, at least 1:2, or at least 3:5, for example. The OC device 12 can optionally further convert various regulated exhaust constituents to other regulated or unregulated exhaust constituents through oxidation. For example, in addition to converting NO to $NO_2$, the OC device 12 can be configured to oxidize hydrocarbons (HC) to carbon dioxide $CO_2$ and water ($H_2O$), convert carbon monoxide (CO) to carbon dioxide ($CO_2$), and convert sulfur dioxide ($SO_2$) to sulfur trioxide ($SO_3$) and/or sulfuric acid ($H_2SO_4$). Other optional oxidations are contemplated as well, including oxidation of aldehydes, polycyclic aromatic hydrocarbons or otherwise. Further, the reactions in OC device 12 can be used to reduce the odor of certain emission components.

The OC device 12 can be housed within a housing (not shown), including a metal housing, such as a metal can having an inlet opening and outlet opening, or otherwise, configured for providing support and directing fluid flow to the OC device 12. The housing may comprise any suitable shape or size including a cylindrically shaped compartment. The compartment further may include attachment features, such as a cylindrical inlet pipe located proximate an inlet opening and a cylindrical outlet pipe located proximate an outlet opening of the compartment for fluid coupling of the OC device 12 to an exhaust pipe and/or another component of the exhaust gas treatment system 10. It should be appreciated that the OC device 12, including the housing, can include one or more additional components for facilitating in operation of the OC device 12, or exhaust gas treatment system 10, including, but not limited to, various gas or temperature sensors, injectors (urea or fuel injectors) or otherwise. Such additional features may be particularly advantageous for monitoring characteristics of the exhaust gas, such as flow rate of certain emission components (e.g., particulate matter or otherwise).

Specifically, the OC device 12 is utilized to oxidize NO species to yield $NO_2$ species. The OC device 12 can comprise many various catalytically active materials and configurations. For example, OC device 12 can comprise a plate-like substrate. In another example, OC device 12 can comprise a metal or ceramic monolith or substrate having a honeycomb-like structure that includes a plurality of generally parallel, longitudinally-extending, interconnected cells that provide a network comprising a plurality of flow channels for receiving exhaust gas 8 and are separated by a corresponding network of cell walls. The substrate has a large surface area along the cell walls. The cell walls can include a washcoat that includes a porous ceramic matrix with a surface that is coated with a catalytically active amount of a platinum group metal catalyst. In some embodiments, suitable platinum group metals include Pt, Pd, Rh, Ru, Os or Ir, or combinations thereof, including alloys thereof. In one embodiment, suitable metals include Pt, Pd. and combinations thereof, including alloys thereof. As the exhaust gas 8 traverses the length of the OC device 12, particularly the flow channels and the washcoated cell walls, the platinum group metal catalyst catalyzes the oxidation of NO to $NO_2$. It is to be understood that the OC device 12 is not limited to the particular examples provided, and can include any catalytically active device capable of oxidizing $NO_x$ species, and particularly NO species.

Figure 2:
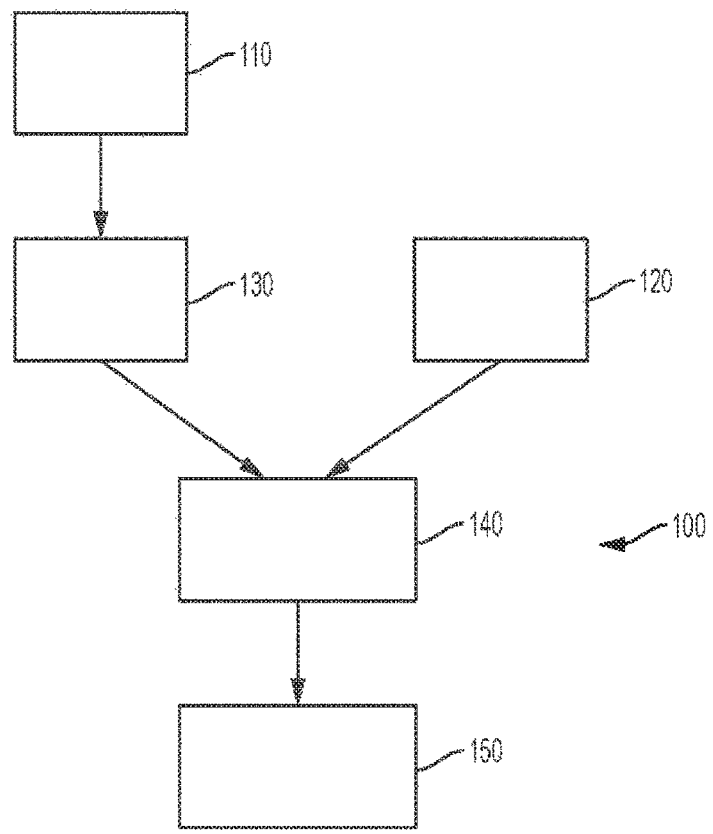
FIG. 2 illustrates a method for monitoring the performance of an oxidizing catalyst device, according to one or more embodiments.

FIG. 2 illustrates a method 100 for monitoring the performance of an OC device comprising treating 110 an exhaust gas stream with the OC device, determining 120 a reference liberated oxygen species measurement of the exhaust gas stream, measuring 130 a downstream liberated oxygen species measurement of the exhaust gas stream using a downstream $NO_x$ sensor in a catalyst inactive mode, and comparing 140 the reference liberated oxygen species measurement to the downstream $NO_x$ liberated oxygen species measurement to determine a liberated oxygen species differential. As shown in FIG. 2, an order is imposed between treating 110 an exhaust gas stream with the OC device and measuring 130 a downstream liberated oxygen species measurement of the exhaust gas stream using a downstream $NO_x$ sensor in a catalyst inactive mode, but no order is imposed for determining 120 a reference liberated oxygen species measurement of the exhaust gas stream relative to treating 110 and measuring 130. Method 100 can optionally further comprise triggering 150 an oxidation catalyst device failure alarm if the liberated oxygen species differential is not above a threshold.

The exhaust gas stream can comprise one or more $NO_x$ species. In particular, the exhaust gas stream comprises one or more of NO and $NO_2$. In some embodiments, the exhaust gas stream comprises both NO and $NO_2$ species. The exhaust gas stream can be generated by an ICE. The ICE can power a vehicle, for example. The ICE can be a diesel ICE. The OC device can comprise the OC devices as described above. The OC device can be positioned upstream from a SCR device or a SCRF device.

The downstream $NO_x$ sensor can comprise a $NO_2$ selective reduction catalyst, such as those described above. In some embodiments, the NO$_2$ selective reduction catalyst can comprise one or more platinum group metals. Specifically, the NO$_2$ selective reduction catalyst can comprise one or more of Pt, Pd, Rh, Ru, Os, and Ir. Such metals can be present as pure metals, compounds (e.g., oxides), and alloys. In some embodiments, the NO$_2$ selective reduction catalyst can comprise a heating element.

The downstream NO$_x$ sensor can comprise an amperometric NO$_x$ sensor. Catalyst inactive mode can comprise an operating condition or orientation at which the NO$_2$ selective reduction catalyst does not substantially reduce NO$_2$. Catalyst inactive mode can comprise an operating condition or orientation at which the NO$_2$ selective reduction catalyst does not reduce any quantity of NO$_2$. Catalyst inactive mode can comprise an operating condition or orientation at which the NO$_2$ selective reduction catalyst reduces less NO$_2$ relative to a catalyst active mode. Catalyst inactive mode, and similarly catalyst active mode, can be defined by a temperature. A temperature can be determined based upon a temperature equilibrium curve of a NO$_2$—NO system, an operating characteristic of a catalytic material, combinations thereof, and other factors. For example, for a NO$_2$ selective reduction catalyst comprising one or more platinum group metals as described above, a catalyst inactive mode can be defined as less than about 650° C., less than about 700° C. less than about 750° C., less than about 800° C., less than about 850° C., or less than about 900° C. Similarly, for a NO$_2$ selective reduction catalyst comprising one or more platinum group metals as described above, a catalyst inactive mode can be defined as greater than about 650° C., greater than about 700 'C', greater than about 750° C. greater than about 800° C., greater than about 850° C., or greater than about 900° C., for example. A catalyst inactive mode operating condition can be defined as a temperature less than the catalyst active mode operating temperature.

In some embodiments, a catalyst inactive mode can comprise an operating condition or orientation in which the exhaust gas stream bypasses the NO$_2$ selective reduction catalyst before or during the first background oxygen purge stage. The NO$_2$ selective reduction catalyst can be positioned within the first stage. In such an embodiment, the catalyst can be bypassed by partitioning the catalyst within the first stage. Alternatively, an alternative catalyst-free first stage can be provided, to which the exhaust gas stream is routed during the first stage while operating in catalyst inactive mode. The NO$_2$ selective reduction catalyst can be positioned outside of the first stage. In such an embodiment, the exhaust gas stream can be delivered to the first stage without contacting the catalyst while operating in catalyst inactive mode. When the catalyst is bypassed in catalyst inactive mode, the operating temperature of the downstream NO$_x$ sensor can be determined based upon one or more of the exhaust temperature as collected at the downstream NO$_x$ sensor, the exit temperature of the exhaust gas from the oxidizing catalyst device, or the exhaust gas temperature at the entrance of a downstream device, such as a selective catalytic reduction device. In some embodiments one such metric is used to determine the operating temperature of the downstream NO$_x$ sensor. In other embodiments, a weighted average of a plurality of such metrics can be used to determine the operating temperature of the downstream NO$_x$ sensor.

In some embodiments, determining 120 a reference liberated oxygen species measurement of the exhaust gas stream comprises measuring using the downstream NO$_x$ sensor in a catalyst active mode. In such an embodiment, the downstream NO$_x$ sensor can operate at a higher temperature in catalyst active mode than in catalyst inactive mode, for example. Additionally or alternatively, the downstream NO$_x$ sensor in a catalyst active mode can be used to determine a total concentration of NO$_x$ species in the exhaust gas stream downstream of the OC device. The liberated oxygen species differential can be used to determine the performance of the OC device, by recognizing the presence of NO$_2$ in the exhaust gas stream downstream of the OC device. Specifically, the downstream liberated oxygen species measurement determined using the downstream NO$_x$ sensor in a catalyst inactive mode will be higher than the reference liberated oxygen species measurement determined using the downstream NO$_x$ sensor in a catalyst active mode if NO$_2$ is present in the exhaust gas stream downstream of the OC device.

In some embodiments, determining 120 a reference liberated oxygen species measurement of the exhaust gas stream comprises measuring using an upstream NO$_x$ sensor in a catalyst inactive mode. In such an embodiment, the upstream NO$_x$ sensor can comprise a NO$_2$ selective reduction catalyst, such as those described above. The upstream NO$_x$ sensor can comprise an amperometric NO$_x$ sensor. The liberated oxygen species differential can be used to determine the performance of the OC device, by recognizing a higher presence of NO$_2$ in the exhaust gas stream downstream of the OC device relative to the exhaust gas stream upstream of the OC device. Specifically, if the NO$_2$:NO ratio of the exhaust gas stream increases after treatment in the OC device, the downstream liberated oxygen species measurement will be larger than the upstream liberated oxygen species measurement. In such embodiments, the liberated oxygen species differential can be used to determine the OC device NO oxidation yield. In such an embodiment, the method 100 can further include triggering 150 an OC device failure alarm if the OC device NO oxidation yield is not above a threshold.

Figure 3:
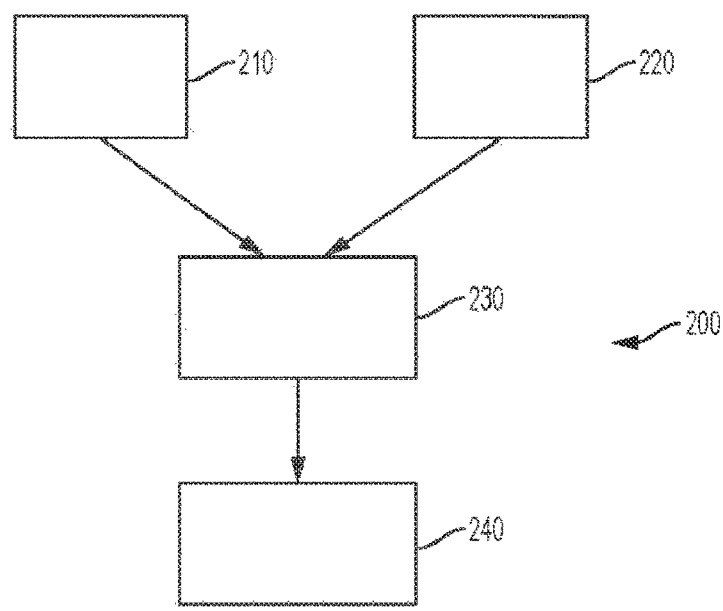
FIG. 3 illustrates a method for using an amperometric gas sensor, according to one or more embodiments.

The methods described herein are not limited to exhaust gas treatment systems, nor systems which include an ICE. Accordingly, FIG. 3 illustrates a method 200 for using an amperometric NO$_x$ sensor utilizing an NO$_2$ selective reduction catalyst comprising operating 210 the amperometric NO$_x$ sensor in a catalyst active mode to generate a first liberated oxygen species measurement, operating 220 the amperometric NO$_x$ sensor in a catalyst inactive mode to generate a second liberated oxygen species measurement, and comparing 230 the first liberated oxygen species measurement to the second liberated oxygen species measurement to determine a liberated oxygen species differential. As shown in FIG. 3, no order is imposed between operating 210 the amperometric NO$_x$ sensor in a catalyst active mode to generate a first liberated oxygen species measurement and operating 220 the amperometric NO$_x$ sensor in a catalyst inactive mode to generate a second liberated oxygen species measurement. Method 200 can optionally further comprise triggering 240 an alarm if the liberated oxygen species differential is not above a threshold.

The NO$_2$ selective reduction catalyst of the amperometric NO$_x$ sensor can include one or more catalysts described above. Catalyst inactive and active modes comprise those as described above. Catalyst inactive mode can comprise an operating temperature lower than the catalyst active mode operating temperature. Catalyst active mode can comprise an operating temperature higher than the catalyst inactive mode operating temperature. For example, for a NO$_2$ selective reduction catalyst comprising one or more platinum group metals as described above, a catalyst inactive mode can be defined as less than about 650° C., less than about 700° C., less than about 750° C., less than about 800° C., less than about 850° C., or less than about 900° C. Similarly, for a $NO_2$ selective reduction catalyst comprising one or more platinum group metals as described above, a catalyst inactive mode can be defined as greater than about 650° C., greater than about 700° C., greater than about 750° C., greater than about 800° C., greater than about 850° C., or greater than about 900° C. for example. Catalyst inactive mode can comprise bypassing the $NO_2$ selective reduction catalyst, as described above.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A method for monitoring the performance of an oxidizing catalyst device, the method comprising:
   treating an exhaust gas stream with the oxidizing catalyst device;
   determining a reference liberated oxygen species measurement of the exhaust gas stream using an upstream NOx sensor or a downstream NOx sensor;
   measuring a downstream liberated oxygen species measurement of the exhaust gas stream using the downstream $NO_x$ sensor in a catalyst inactive mode, wherein the downstream $NO_x$ sensor comprises a first sample-receiving stage including a $NO_2$ selective reduction catalyst configured to reduce $NO_2$ to NO and a second sample-receiving stage configured to reduce NOx species to liberated N2 and O2 species and measure the liberated O2 species, and catalyst inactive mode comprises an operating condition or configuration at which the $NO_2$ selective reduction catalyst does not substantially reduce $NO_2$;
   comparing the reference liberated oxygen species measurement to the downstream $NO_x$ liberated oxygen species measurement to determine a liberated oxygen species differential; and
   using the liberated oxygen species differential to determine the NO oxidizing performance of the oxidizing catalyst device.

2. The method of claim 1, wherein the catalyst inactive mode comprises bypassing the $NO_2$ selective reduction catalyst.

3. The method of claim 2, wherein the operating temperature of the downstream $NO_x$ sensor in a catalyst inactive mode is equal to the exhaust temperature as collected at the downstream $NO_x$ sensor, the exit temperature of the exhaust gas from the oxidizing catalyst device, or the exhaust gas temperature at the entrance of a downstream selective catalytic reduction device.

4. The method of claim 1, wherein the $NO_2$ selective reduction catalyst of the downstream $NO_x$ sensor comprises a heating element.

5. The method of claim 1, further comprising triggering an oxidation catalyst device failure alarm if the liberated oxygen species differential is below a threshold.

6. The method of claim 1 wherein the reference liberated oxygen species measurement is determined using the downstream $NO_x$ sensor in a catalyst active mode, wherein the catalyst active mode comprises an operating condition or configuration at which the $NO_2$ selective reduction catalyst reduces more $NO_2$ relative to the catalyst inactive mode.

7. The method of claim 6, wherein the catalyst inactive mode comprises an operating temperature lower than the catalyst active mode operating temperature.

8. The method of claim 6, further comprising using the reference liberated oxygen species measurement value to determine a total downstream $NO_x$ species concentration.

9. The method of claim 1 wherein the reference liberated oxygen species measurement is determined using the upstream $NO_x$ sensor in a catalyst inactive mode wherein the upstream $NO_x$ sensor comprises a first sample-receiving stage including a $NO_2$ selective reduction catalyst configured to reduce $NO_2$ to NO and a second sample-receiving stage configured to reduce NOx species to liberated $N_2$ and $O_2$ species and measure the liberated $O_2$ species, and the catalyst inactive mode comprises an operating condition or configuration at which the $NO_2$ selective reduction catalyst does not substantially reduce $NO_2$.

10. The method of claim 9, wherein determining the NO oxidizing performance of the oxidizing catalyst device comprises determining the oxidizing catalyst device NO oxidation yield.

11. The method of claim 10, further comprising triggering an oxidation catalyst device failure alarm if the oxidation catalyst device NO oxidation yield is below a threshold.

12. The method of claim 1, further comprising triggering an oxidation catalyst device failure alarm if the liberated oxygen species differential is below a threshold.

13. A method for monitoring the performance of an oxidizing catalyst device, the method comprising:
   treating an exhaust gas stream with the oxidizing catalyst device;
   determining a reference liberated oxygen species measurement of the exhaust gas stream using an upstream NOx sensor in a catalyst inactive mode, wherein the upstream $NO_x$ sensor is disposed upstream from the oxidizing catalyst device and comprises a first sample-receiving stage including a $NO_2$ selective reduction catalyst configured to reduce $NO_2$ to NO and a second sample-receiving stage configured to reduce NOx species to liberated $N_2$ and $O_2$ species and measure the liberated $O_2$ species, and the catalyst inactive mode comprises an operating condition or configuration at which the $NO_2$ selective reduction catalyst reduces less $NO_2$ relative to a catalyst active mode;
   measuring a downstream liberated oxygen species measurement of the exhaust gas stream using a downstream $NO_x$ sensor in a catalyst inactive mode, wherein the downstream $NO_x$ sensor is disposed downstream from the oxidizing catalyst device and comprises a first sample-receiving stage including a $NO_2$ selective reduction catalyst configured to reduce $NO_2$ to NO and a second sample-receiving stage configured to reduce NOx species to liberated N2 and O2 species and measure the liberated O2 species, and the catalyst inactive mode comprises an operating condition or configuration at which the $NO_2$ selective reduction catalyst reduces less $NO_2$ relative to a catalyst active mode;

comparing the reference liberated oxygen species measurement to the downstream $NO_x$ liberated oxygen species measurement to determine a liberated oxygen species differential; and triggering an oxidation catalyst device failure alarm if the liberated oxygen species differential and/or the oxidation catalyst device NO oxidation yield is below a respective threshold, wherein the oxidizing catalyst device NO oxidation yield is determined using the liberated oxygen species differential.

14. The method of claim 13, wherein the catalyst inactive mode comprises an operating condition or configuration at which the $NO_2$ selective reduction catalyst does not substantially reduce $NO_2$.

15. The method of claim 13, wherein the catalyst inactive mode comprises an operating temperature lower than the catalyst active mode operating temperature.

16. The method of claim 13, wherein the catalyst inactive mode comprises bypassing the $NO_2$ selective reduction catalyst.

17. A method for monitoring the performance of an oxidizing catalyst device, the method comprising:

treating an exhaust gas stream with the oxidizing catalyst device;

determining a reference liberated oxygen species measurement of the exhaust gas stream using a downstream NOx sensor in catalyst active mode, wherein the downstream NOx sensor is disposed downstream from the oxidizing catalyst device and comprises a first sample-receiving stage including a $NO_2$ selective reduction catalyst configured to reduce $NO_2$ to NO and a second sample-receiving stage configured to reduce NOx species to liberated N2 and O2 species and measure the liberated O2 species;

measuring a downstream liberated oxygen species measurement of the exhaust gas stream using the downstream $NO_x$ sensor in a catalyst inactive mode, wherein the catalyst inactive mode comprises an operating condition or configuration at which the $NO_2$ selective reduction catalyst reduces less $NO_2$ relative to a catalyst active mode;

comparing the reference liberated oxygen species measurement to the downstream $NO_x$ liberated oxygen species measurement to determine a liberated oxygen species differential; and triggering an oxidation catalyst device failure alarm if the liberated oxygen species differential is below a threshold.

18. The method of claim 17, wherein the catalyst inactive mode comprises an operating condition or configuration at which the $NO_2$ selective reduction catalyst does not substantially reduce $NO_2$.

19. The method of claim 17, wherein the catalyst inactive mode comprises an operating temperature lower than the catalyst active mode operating temperature.

20. The method of claim 17, wherein the catalyst inactive mode comprises bypassing the $NO_2$ selective reduction catalyst.

* * * * *